Patented Oct. 7, 1947

2,428,352

UNITED STATES PATENT OFFICE 2,428,352

TREATMENT OF MENTHADIENE-7-CARBINOLS AND PRODUCT THEREOF

Joseph P. Bain and Albert H. Best, Jacksonville, Fla., assignors, by mesne assignments, to The Glidden Company, Cleveland, Ohio, a corporation of Ohio No Drawing. Application March 18, 1944,
Serial No. 527,131

3 Claims. (Cl. 260—617)

The present invention relates to the preparation of new alcohol compositions, to the alcohols resulting therefrom, and their esters and ethers. More particularly this invention is directed to primary monocyclic alcohols containing eleven carbon atoms.

In U. S. Patent 2,340,294, the formation of an alcohol by the reaction of nopinene (beta-pinene) with anhydrous formaldehyde is disclosed. The alcohol so produced possesses the empirical formula $C_{11}H_{18}O$, and is a bicyclic primary unsaturated alcohol. Because of its preparation from nopinene, the alcohol has been named Nopol. It is believed to possess the following structure:

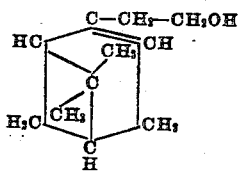

It is possible to convert nopol into a number of isomeric monocyclic alcohols, of the same generic formula $C_{11}H_{18}O$, apparently differing from each other only in the position of the double bonds. That is to say, they have substantially the same relation to each other that the $C_{10}H_{16}$ hydrocarbons dipentene, terpinene, terpinolene and phellandrene, for example, bear to each other.

These alcohols, obtained either as the principal product, or as by-products of reactions involving acid catalysis, liquid phase pyrolysis, or vapor phase pyrolysis of nopol, have boiling points in the range of from substantially 125° C. to substantially 135° C. at a pressure of 10 mm. mercury as referred to a 760 mm. barometer, and show considerable variation in their physical properties. Representatives of these alcohols may consist of such monocyclic $C_{11}H_{18}O$ alcohols as:

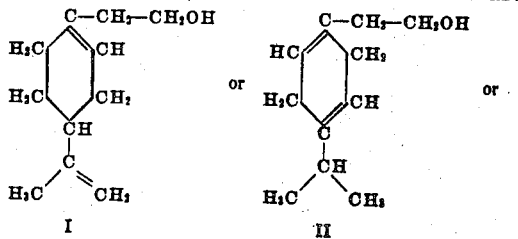

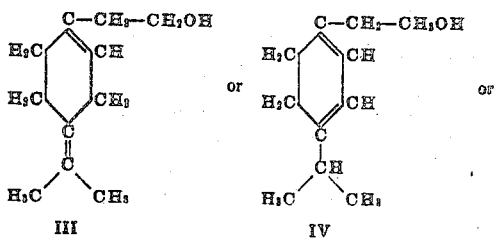

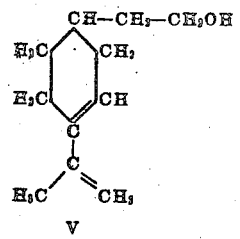

These alcohols may be generically characterized as menthadiene-7-carbinols. The complexity of mixtures of any or all of the isomeric compounds is readily apparent since the product of any established or demonstrable mechanism for their preparation may be optically active or optically inactive depending upon the particular mechanism chosen. The degree, or even total absence, of optical activity of this particular product will thus be of little import in general in the determination of the composition of the mixture of alcohols comprising this product.

All of the alcohols whose constitutions have been given possess two double bonds, hence are unsaturated. Together with this undesirable characteristic, or as a result of it, these alcohols are readily oxidized. The instability of the menthadiene-7-carbinols is sufficiently great to affect adversely the range of applications in industry in which they might otherwise be employed.

It is accordingly, an object of our invention to reduce the degree of unsaturation in the monocyclic isomers of compounds of the class consisting of nopols, and ethers and esters thereof.

It is another object of our invention to produce the saturated alcohols by hydrogenation of menthadiene-7-carbinols.

Another object of our invention is to subject the menthadiene-7-carbinols to a disproportionation mechanism to reduce the degree of unsaturation.

Another object of our invention is to produce mixtures of the reaction product obtained by hydrogenation of menthadiene-7-carbinols and the disproportionation product of the hydrogenation reaction product.

Still another object of our invention is to heat the menthadiene-7-carbinols in the presence of a hydrogenation catalyst to reduce the degree of unsaturation.

It is yet another object to produce 4-isopropyl-cyclohexyl-ethanol from menthadiene-7-carbinols.

It is another object of our invention to produce para-isopropyl-phenethanol from menthadiene-7-carbinols.

Other objects and a fuller understanding of our invention will be had by referring to the following description and claims.

When the menthadiene-7-carbinols are subjected to hydrogenation, saturation is readily attained with the formation of 4-isopropyl-cyclohexyl ethanol. The reaction is usually carried out under pressure and in the presence of one of the catalysts usually employed for hydrogenation.

The equivalent reactions proceed equally well with the esters or ethers of the isomeric monocyclic alcohols, whether produced by esterification or etherification of these monocyclic alcohols or if they result from the formation of the esters or ethers of nopol before the subjection of the bicyclic compound to acid catalysis or to pyrolysis to form the corresponding monocyclic compounds.

When disproportionation is initiated in the case of the monocyclic alcohols, it has been found to result in the formation of 4-isopropyl-cyclohexyl-ethanol and the aromatic alcohol para-isopropyl-phenethanol.

Our invention is additionally exemplified by consideration of the specific examples given below:

*Example I*

Seventy-one parts of a mixture of the isomeric monocyclic alcohols resulting from liquid phase pyrolysis of nopol, this mixture having a boiling point of substantially 127° C. at 10 mm. pressure, index of refraction at 25° C. ($N^{25}$) of substantially 1.49, and a specific rotation at 25° C. ($\alpha_d^{25}$) of substantially +3 (using a 10 cm. polarimeter tube) were taken, and hydrogenated, using a nickel catalyst, at a temperature of 175° C. and pressure of about 4000 pounds per square inch.

After separation from the reaction mass by fractional distillation, fifty parts of the desired product, 4-isopropyl-cyclohexyl-ethanol were obtained. This product was found to possess the following characteristics:

Boiling point (10 mm. pressure) _°C__ 126.5–127.5
Refractive index at 33° C_____ 1.464
Density at 33° C_____ .899

This alcohol possessed a very pleasant odor.

*Example II*

Six hundred parts of a mixture of the isomeric monocyclic alcohols resulting from fractionation of vapor phase pyrolyzed nopol were taken, having the following properties:

Boiling point at 10 mm_____°C__ 123.5–125
Refractive index at 25° C_____ Ca 1.497

The mixture was heated with ten parts of palladium on charcoal at temperatures between 175° C. and 230° C. until the bromine absorption value of the reaction mass became substantially zero. Heating was discontinued, and the mass filtered to recover the liquid product, which was then fractionated. The fore-run consisting almost entirely of hydrocarbons, amounted to about 150 parts. The principal cut, consisting of the disproportionated product distilled in a temperature range of from 121° C. to 128° C., the fractionation being conducted at a pressure of 10 mm. of mercury.

Because of the comparatively narrow temperature range for fractionation, quantitative separation of the reaction products could not readily be achieved. It was found, however, that the highest boiling fractions, that is fractions collected at temperatures just below the maximum value of 128° C. consisted of practically pure para-isopropyl-phenethanol, with a refractive index at 25° C. of 1.515 and a density at 25° C. of .9605. Proof of constitution was afforded, firstly, by conversion of the alcohol to terephthalic acid, and secondly, by conversion to the naphthyluretane, which had a melting point of 99°–100° C., a value identical with the melting point of naphthyluretane, freshly prepared from para-isopropyl-phenethanol, which in turn had been synthesized by reduction of the butyl ester of cymene-7-carboxylic acid.

*Example III*

Nopol was heated in the liquid phase under pressure for five hours at temperatures in the range of from 250° to 290° C. At the end of this period, the reaction product was fractionated, and the fraction collected in the temperature range of from substantially 125° to 129° C. at 10 mm. pressure, and the mixture of menthadiene-7-carbinols thus obtained had a refractive index at 25° C. of 1.50, and a specific rotation at 25° C. ($\alpha_d^{25}$) of +2.5 (using a 10 cm. polarimeter tube). This mixture was then heated over palladium, the temperature being held within the range of from 140° to 150° C. The reaction product had a boiling point of 124°–126° at 10 mm. pressure, was found to be composed of a mixture of para-isopropyl-phenethanol and 4-isopropyl-cyclohexyl-ethanol, and was a colorless oil of pleasant odor.

Ethers and esters of the alcohols of the present invention may, of course, be prepared by etherification or esterification of the alcohols, or may be prepared by the hydrogenation or disproportionation of the corresponding ethers and esters menthadiene-7-carbinols.

In the process of formation of the disproportionation products, it is believed that the mechanism of the reaction may be represented by the following type equation:

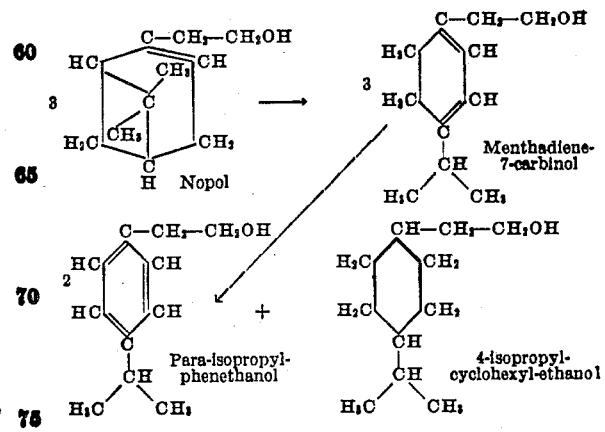

While this equation shows the reaction product to consist of a mixture of two moles of para-isopropyl-phenethanol with one mole of 4-isopropyl-cyclohexyl-ethanol, it will be understood that the progress of the reaction may be controlled to give final products consisting of admixtures of the isomers of nopol with para-isopropyl-phenethanol and 4-isopropyl-cyclohexyl-ethanol in various proportions.

These and other variations to be employed will be apparent to those skilled in the art. For example, the menthadiene-7-carbinols may first be partially hydrogenated and the resulting mixture of partially hydrogenated alcohols subsequently exposed to the disproportionation reaction.

Again, we have disclosed the utilization of nickel catalysts for hydrogenation, and of palladium catalysts for disproportionation, but it will be evident that the other catalysts which are known to activate these types of reactions may be used without substantially affecting the natures or fields of the processes disclosed, or of the compositions resulting from the processes employed.

Although we have described our invention with a certain degree of particularity, it is understood that the present disclosure is only by way of disclosure and that numerous changes may be made in the operations of the process and in specific composition without departing from the spirit and scope of our invention. What we claim is:

1. The process which comprises catalytically disproportionating the monocyclic isomers of 7-methylol $\Delta^{1,2}$ pinene.
2. As a new composition of matter, 4-isopropyl-cyclohexyl-ethanol.
3. The process which consists in heating a menthadiene-7-carbinol with a hydrogenation catalyst to reduce the degree of unsaturation of the carbinol.

JOSEPH P. BAIN.
ALBERT H. BEST.

REFERENCES CITED

The following references are of record in the file of this patent:

UNITED STATES PATENTS

| Number | Name | Date |
| --- | --- | --- |
| 2,340,294 | Bain | Feb. 1, 1944 |
| 2,339,818 | Rummelsburg | Jan. 25, 1944 |

FOREIGN PATENTS

| Number | Country | Date |
| --- | --- | --- |
| 826,580 | France | Jan. 8, 1938 |
| 127,855 | Germany | Jan. 20, 1902 |

OTHER REFERENCES

Braun, Ber. Deut. Chem., 60B, pp. 102–10 (1927).

Becherer, "Helv. Chim. Acta," vol. 8, pp. 184–95 (1925).